United States Patent
Sato et al.

(10) Patent No.: US 11,001,729 B2
(45) Date of Patent: May 11, 2021

(54) COATING MATERIAL, COATING FILM, AND GAS INSULATED SWITCHGEAR

(71) Applicant: Mitsubishi Electric Corporation, Chiyoda-ku (JP)

(72) Inventors: Satoru Sato, Chiyoda-ku (JP); Naoki Yasuda, Chiyoda-ku (JP); Nobuo Yokomura, Chiyoda-ku (JP); Ryoko Kawano, Chiyoda-ku (JP); Manabu Yoshimura, Chiyoda-ku (JP); Shinichiro Nakauchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 129 days.

(21) Appl. No.: 16/098,268

(22) PCT Filed: Apr. 6, 2017

(86) PCT No.: PCT/JP2017/014314
§ 371 (c)(1),
(2) Date: Nov. 1, 2018

(87) PCT Pub. No.: WO2017/221511
PCT Pub. Date: Dec. 28, 2017

(65) Prior Publication Data
US 2019/0144703 A1  May 16, 2019

(30) Foreign Application Priority Data
Jun. 20, 2016 (JP) .............................. JP2016-121396

(51) Int. Cl.
*C09D 163/00* (2006.01)
*C09D 7/62* (2018.01)
(Continued)

(52) U.S. Cl.
CPC .............. *C09D 163/00* (2013.01); *C09D 7/20* (2018.01); *C09D 7/45* (2018.01); *C09D 7/62* (2018.01);
(Continued)

(58) Field of Classification Search
CPC ...... C09D 163/00; C09D 210/00; C09D 7/20; C09D 7/45; C09D 7/62; H02G 5/065; C08K 2003/2296; H02B 13/035; H02B 13/045
See application file for complete search history.

(56) References Cited

U.S. PATENT DOCUMENTS

| | | |
|---|---|---|
| 5,144,564 A | 9/1992 | Naidu et al. |
| 2007/0264438 A1* | 11/2007 | Kawai .................. H05K 3/4661 427/445 |

(Continued)

FOREIGN PATENT DOCUMENTS

| | | |
|---|---|---|
| CN | 107171610 A | 9/2017 |
| EP | 2 405 550 A1 | 1/2012 |

(Continued)

OTHER PUBLICATIONS

Machine translation of JP2014013786, publication date Jan. 23, 2014.*

(Continued)

*Primary Examiner* — Jun Li
(74) *Attorney, Agent, or Firm* — Xsensus LLP (57) ABSTRACT

A coating material of the present invention includes an insulating resin, and dispersion particles dispersed in the insulating resin. The dispersion particle includes a core particle containing zinc oxide as a main component and having nonlinear resistance, and a resin layer covering the surface of the core particle and having an average thickness being less than or equal to 5.0 μm. The coating material of (Continued)

the present invention is a coating material for coating an inner surface of a ground tank of a gas insulated switchgear.

9 Claims, 5 Drawing Sheets

(51) Int. Cl.
    *C09D 7/40*                (2018.01)
    *C09D 7/45*                (2018.01)
    *H02B 13/045*            (2006.01)
    *C09D 201/00*            (2006.01)
    *H02G 5/06*                (2006.01)
    *C09D 7/20*                (2018.01)
    *C08K 3/22*                (2006.01)

(52) U.S. Cl.
    CPC .............. *C09D 7/69* (2018.01); *C09D 201/00* (2013.01); *H02G 5/065* (2013.01); *C08K 2003/2296* (2013.01); *H02B 13/045* (2013.01)

(56) References Cited

U.S. PATENT DOCUMENTS

2014/0138352 A1*   5/2014   Lille ................. C23C 16/45555
                                                         216/41
2015/0357801 A1   12/2015   Nakauchi et al.
2016/0009948 A1    1/2016   Matsuzaki et al.
2017/0069448 A1    3/2017   Kainaga et al.

FOREIGN PATENT DOCUMENTS

| | | |
|---|---|---|
| JP | 11-172153 A | 6/1999 |
| JP | 2006-36994 A | 2/2006 |
| JP | 2006-291126 A | 10/2006 |
| JP | 2010-53173 A | 3/2010 |
| JP | 2010-207047 A | 9/2010 |
| JP | 2012063438 A * | 3/2012 |
| JP | 2014-13786 A | 1/2014 |
| JP | 2014-148426 A | 8/2014 |
| JP | 2014-148568 A | 8/2014 |
| JP | 2014-204488 A | 10/2014 |
| JP | 5710080 B2 | 4/2015 |
| WO | WO 2015/136753 A1 | 9/2015 |

OTHER PUBLICATIONS

Machine translation of JP2010053173, publication date Mar. 11, 2010.*
Machine translation of JP2012063438-A, publication date Mar. 29, 2012.*
International Search Report dated Jul. 11, 2017 in PCT/JP2017/014314 filed Apr. 6, 2017.
Indian Office Action dated Mar. 17, 2021 in Indian Application No. 202027022051.

* cited by examiner

COATING MATERIAL, COATING FILM, AND GAS INSULATED SWITCHGEAR

TECHNICAL FIELD

The present invention relates to a coating material, a coating film and a gas insulated switchgear.

BACKGROUND ART

In a gas insulated switchgear (GIS), a metallic tank at a ground potential (ground tank) contains a center conductor to which a high voltage is applied, and a space between the ground tank and the center conductor is filled with an insulating gas to secure insulation performance.

However, during production or installation operation on site, contaminants may be mixed in the ground tank. When millimeter-sized metallic contaminants are mixed in the ground tank, the metallic contaminants are charged under the influence of an electric field generated from the center conductor to which a high voltage is applied, so that an electrostatic force is exerted in a floating direction from the inner bottom surface of the ground tank. When the electrostatic force is greater than the gravity acting on the contaminants, the contaminants float, and move toward the center conductor. The electric field concentrates on the periphery of the contaminants, and therefore the contaminants get close to or stick to the central conductor, the electric field may locally increase, leading to deterioration of voltage resistance performance of the gas insulated switchgear.

Thus, it is necessary that the mixed metallic contaminants be held on the inner bottom surface of the ground tank to suppress the behavior of the metallic contaminants in the ground tank. As a method for suppressing the behavior of metallic contaminants, a method is known in which the inner surface of a ground tank is provided with a coating film having insulation quality. Accordingly, movement of charge from the inner surface of the grounded tank to metallic contaminants is suppressed, so that charge having a polarity opposite to that of the center conductor is inhibited from being accumulated on the metallic contaminants. Thus, a situation is prevented in which metallic contaminants float, and stick to the center conductor, leading to occurrence of flashover.

In addition, in a gas insulated switchgear as disclosed in PTL 1 (U.S. Pat. No. 5,710,080), the inner surface of a ground tank is provided with a first coating film having insulating quality, and the first coating film is provided with a second coating film having nonlinear resistance (non-straight-linear resistance) is provided. Accordingly, movement of charge from the inner surface of the ground tank to metallic contaminants is blocked by the first coating film. In addition, the second coating film exhibits conductivity, and therefore when the electric field intensity is high, charging due to polarization and partial discharge of the metallic contaminants is suppressed by the second coating film. Therefore, it is possible to suppress the behavior of metallic substances in all of regions with a low electric field intensity and regions with a high electric field intensity.

In addition, regarding such a coating film having nonlinear resistance, PTL 2 (Japanese Patent Laying-Open No. 2014-13786) discloses a coating composition for uniformly dispersing particles having nonlinear resistance in a coating film.

CITATION LIST

Patent Literature

PTL 1: U.S. Pat. No. 5,710,080
PTL 2: Japanese Patent Laying-Open No. 2014-13786

SUMMARY OF INVENTION

Technical Problems

When the resistivity of a coating film having nonlinear resistance decreases at the time when the electric field intensity is low, partial discharge on the periphery of metallic contaminants can be suppressed, but it is difficult to suppress movement of charge from a ground tank of a gas insulated switchgear to the metallic contaminants. Thus, in a coating film having nonlinear resistance, the electric field strength at which the resistivity begins to decrease (nonlinear resistance development electric field intensity) is preferably high.

The nonlinear resistance electric field development intensity considerably depends on the properties of dispersion particles contained in a coating film. In coating films having nonlinear resistance as described in PTLs 1 and 2, the nonlinear resistance property development electric field intensity is affected by the dispersion state, blending amount and the like of dispersion particles (particles having nonlinear resistance). Thus, the development electric field intensity of the coating film having nonlinear resistance may decrease to the extent that the behavior of metallic contaminants cannot be sufficiently suppressed.

The present invention has been made in view of the above-described problems, and an object of the present invention is to increase an electric field intensity at which the resistivity begins to decrease in a coating film having nonlinear resistance.

Solutions to Problems

A coating material of the present invention includes an insulating resin, and dispersion particles dispersed in the insulating resin. The dispersion particle includes a core particle, and a resin layer covering a surface of the core particle. The core particle includes zinc oxide as a main component, and has nonlinear resistance. The resin layer has an average thickness of less than or equal to 5.0 μm. The coating material of the present invention is a coating material for coating an inner surface of a ground tank of a gas insulated switchgear.

Advantageous Effects of Invention

According to the present invention, it is possible to increase an electric field intensity at which the resistivity begins to decrease in a coating film having nonlinear resistance.

DESCRIPTION OF EMBODIMENTS

Hereinafter, embodiments of the present invention will be described with reference to the drawings. Within the scope of the present invention, embodiments can be freely combined, or appropriately modified or omitted.

Embodiment 1

Figure 1:
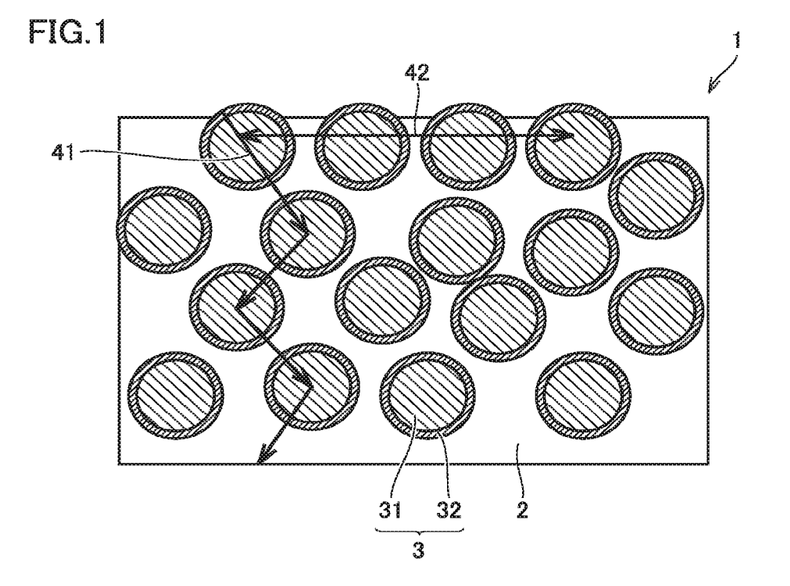
FIG. 1 is a schematic sectional view showing a configuration of a coating film according to embodiment 1.

FIG. 1 is a schematic sectional view showing a configuration of a coating film according to embodiment 1. As shown in FIG. 1, a coating film 1 contains an insulating resin 2 and dispersion particles 3 dispersed in insulating resin 2, and has nonlinear resistance.

Insulating resin 2 is not particularly limited as long as it is a resin which is used for a coating material, and has insulation quality, and insulating resin 2 may be liquid, or solid as long as it is soluble in a solvent. As insulating resin 2, for example, various thermosetting resins, thermoplastic resins, thermosensitive resins and the like can be used. As the solvent, mention is made of at least one solvent selected from alcohols, aliphatic (or aromatic) carboxylic acid esters, ketones, ethers, ether esters, aliphatic (or aromatic) hydrocarbons and the like.

Examples of the thermosetting resin include epoxy resins, phenol resins, melamine resins, unsaturated polyester resins and polyamide resins.

Examples of the thermoplastic resin include polyurethanes, polyvinyl resins, cellulose resins, fluororesins and acrylic resins.

Examples of the photosensitive resin include urethane acrylates, acrylic resin acrylates and epoxy acrylates.

Among them, thermosetting resins are preferable, with epoxy resins being especially preferable. The epoxy resin includes an epoxy compound having two or more epoxy groups per molecule.

Specific examples of the epoxy resin include bisphenol A-type epoxy resins, brominated bisphenol A-type epoxy resins, hydrogenated bisphenol A-type epoxy resins, bisphenol F-type epoxy resins, bisphenol S-type epoxy resins, bisphenol AF-type epoxy resins, biphenyl-type epoxy resins, naphthalene-type epoxy resins, fluorene-type epoxy resins, novolak-type epoxy resins, phenol-novolak-type epoxy resins, orthocresol-novolac-type epoxy resins, tris(hydroxyphenyl)methane-type epoxy resins, glycidyl ether-type epoxy resins such as tetraphenylolethane-type epoxy resins, glycidyl ester-type epoxy resins obtained by condensation of epichlorohydrin and carboxylic acid, and heterocyclic epoxy resins such as hydantoin-type epoxy resins obtained by reaction of triglycidyl isocyanate or epichlorohydrin with a hydantoin.

As insulating resin 2, one of the resins may be used, or two or more of the resins may be mixed and used.

The coating material of this embodiment may contain a curing agent for curing an insulating resin (e.g. a thermosetting resin such as an epoxy resin). The kind of the curing agent is not particularly limited as long as it cures the insulating resin.

As a specific curing agent, for example, an amine-based curing agent, an acid anhydride-based curing agent or the like can be used. Examples of the amine-based curing agent include ethylenediamine and polyamideamine. Examples of the acid anhydride-based curing agent include phthalic anhydride, hexahydrophthalic anhydride, 4-methylhexahydrophthalic anhydride, tetrahydrophthalic anhydride, 4-methyltetrahydrophthalic anhydride and tetrabromophthalic anhydride.

Next, a dispersion particle 3 will be described.

In dispersion particle 3, a core particle 31 is a particle containing zinc oxide as a main component, and has nonlinear resistance. The "main component" is, for example, a component that is the most abundant in the core particle. The content of zinc oxide based on the total amount of core particle 31 is preferably greater than or equal to 50% by mass, more preferably greater than or equal to 70% by mass, still more preferably greater than or equal to 90% by mass.

Preferably, core particle 31 includes a polycrystalline sintered body. This is because the nonlinear resistance property is developed at grain boundaries of zinc oxide crystals aggregated by sintering. That is, zinc oxide crystals are aggregated by sintering, and the nonlinear resistance property is developed between the crystals. Therefore, individual particles themselves of core particles 31 exhibit the nonlinear resistance property.

In addition, core particle 31 is preferably a sintered body because it is a polycrystalline material as described above. A polycrystalline material can be obtained by, for example, sintering a composition containing zinc oxide as a main component, and further containing other metal oxides.

A coating material containing such core particles 31, and a coating film which is a cured product of the coating material have high insulation quality in a region with a low electric field intensity (low voltage), and low resistance in a region with a high electric field intensity (high voltage).

The surface of core particle 31 is covered with a resin layer 32. Accordingly, in a coating film which is prepared using the coating material of this embodiment, and has nonlinear resistance, an electric field intensity at which the resistivity begins to decrease (nonlinear resistance development electric field intensity; hereinafter, sometimes referred to simply as a "development electric field intensity") can be increased. That is, the resistivity does not decrease at the time when the electric field intensity is low, and the resistivity begins to decrease at the time when the electric field intensity is high.

This is an effect caused by covering core particles 31 with resin layer 32. The longer the distance between nuclear particles 31, the higher the development electric field intensity. Therefore, by resin layer 32, the distance between core particles 31 in coating film 1 is set to an appropriate distance that is not less than a certain value (twice the thickness of resin layer 32), so that the development electric field intensity of coating film 1 is increased.

The resin to be used as a material of resin layer 32 is not particularly limited as long as it is used as a coating material, and has electric insulation quality, and examples thereof include thermoplastic resins, thermosetting resins and photosensitive resins. Examples of the thermoplastic resin include polyurethanes, polyvinyl resins, cellulose resins, fluororesins and acrylic resins. Examples of the thermosetting resin include epoxy resins, phenol resins, melamine resins, unsaturated polyester resins and polyamide resins. Examples of the photosensitive resin include urethane acrylates, acrylic resin acrylates and epoxy acrylates. A mixture of two or more selected from the above-mentioned resins may be used.

Among them, thermosetting resins are especially preferable, with epoxy resins being still more preferable. The epoxy resin includes an epoxy compound having two or more epoxy groups per molecule.

Specific examples of the epoxy resin include bisphenol A-type epoxy resins, brominated bisphenol A-type epoxy resins, hydrogenated bisphenol A-type epoxy resins, bisphenol F-type epoxy resins, bisphenol S-type epoxy resins, bisphenol AF-type epoxy resins, biphenyl-type epoxy resins, naphthalene-type epoxy resins, fluorene-type epoxy resins, novolak-type epoxy resins, phenol-novolak-type epoxy resins, orthocresol-novolac-type epoxy resins, tris(hydroxyphenyl)methane-type epoxy resins, glycidyl ether-type epoxy resins such as tetraphenylolethane-type epoxy resins, glycidyl ester-type epoxy resins obtained by condensation of epichlorohydrin and carboxylic acid, and heterocyclic epoxy resins such as hydantoin-type epoxy resins obtained by reaction of triglycidyl isocyanate or epichlorohydrin with a hydantoin. One of the epoxy resins may be used, or two or more of the resins may be mixed and used.

The curing agent for curing the epoxy resin chemically reacts with the epoxy resin to cure the epoxy resin. The kind of the curing agent is not particularly limited as long as it can be used for curing an epoxy resin.

As the curing agent, for example, an amine-based curing agent, an acid anhydride-based curing agent or the like can be used.

As the amine-based curing agent, for example, ethylenediamine, polyamideamine or the like can be used.

As the acid anhydride-based curing agent, phthalic anhydride, hexahydrophthalic anhydride, 4-methylhexahydrophthalic anhydride, tetrahydrophthalic anhydride, 4-methyltetrahydrophthalic anhydride or tetrabromophthalic anhydride.

The method for covering core particles with the resin layer is not particularly limited, and various known coating methods can be used to cover core particles 31 with the resin layer.

Examples of the coating method include coating methods as described in publications such as Granulation Handbook (edited by The Association of Powder Process Industry and Engineering, JAPAN, Ohmsha, Ltd.), and Particle Design Engineering (edited by The Society of Powder Technology, Japan, Sangyo Tosho). In the present invention, a coating method using a fluidized bed-type coating apparatus is preferable. When using a fluidized bed-type coating apparatus, a liquid resin is spray-jetted while core particles 31 are caused to flow in a fluidized bed granulating machine, resin layer 32 can be formed on the surfaces of core particles 31. As conditions for covering 1 kg of core particles 31 with resin layer 32 by the fluidized bed-type coating apparatus, for example, the temperature of supplied air is 80 to 100° C., and the spraying speed is 1.6 to 3.7 mL/min.

At the time when core particles 31 are covered with resin layer 32, core particles 31 (dispersion particles 3) may be aggregated with resin layer 32 interposed between the particles. Preferably, the aggregated dispersion particles are removed by a sieve because they cause a reduction in the nonlinear resistance property development electric field intensity.

The number average particle diameter of dispersion particles 3 is preferably 10 to 130 µm so that the nonlinear resistance property is favorably developed. When the number average particle diameter is not within the above-mentioned range, the nonlinear resistance property is deteriorated. When the number average particle diameter is less than 10 µm, the number of grain boundaries of zinc oxide particles which exhibit the nonlinear resistance property is insufficient, and when the number average particle diameter is larger than 130 µm, the film forming property of the coating film deteriorates.

The number average particle diameter can be determined by dispersing dispersion particles 3 in a resin, observing a cross-section of the cured resin with a scanning electron microscope (SEM) to individually measure the particle diameters of core particles 31, and arithmetically averaging the individual measured values.

The average thickness of resin layer 32 covering core particles 31 is less than or equal to 5.0 µm, preferably greater than or equal to 0.1 µm and less than or equal to 3.0 µm, more preferably greater than or equal to 0.5 µm and less than or equal to 1.0 µm. Here, it is possible to further increase an electric field intensity at which the resistivity of the coating film as a cured product of the coating material begins to decrease (nonlinear resistance property development electric field intensity). This is because the resin is interposed between particles to increase a resistance value in a current path.

Preferably, the resin layer does not have fluidity at room temperature, and covers the surfaces of the core particles in a solid state.

The content ratio of dispersion particles 3 is preferably greater than or equal to 20% by volume and less than or equal to 70% by volume based on 100% by volume of the total of the coating material except volatile components. Here, it is possible to further increase an electric field intensity at which the resistivity of the coating film as a cured product of the coating material begins to decrease. This is because when the content of dispersion particles 3 is less than 20% by volume, the coating film has insulation quality, and when the content of dispersion particles 3 is more than 70% by volume, it is difficult to form a coating film.

Here, when dispersion particles 3 (core particles 31 covered with resin layer 32) are crushed or ground, crushed or ground dispersion particles 3 are observed with a scanning electron microscope, the interfaces between core particles 31 and resin layer 32 can be discriminated, and the average thickness of resin layer 32 of dispersion particles 3 can be measured by, for example, the SEM.

The coating material of this embodiment may further contain an anti-settling agent for uniformly dispersing dispersion particles 3 in the coating film, in addition to insulating resin 2 and dispersion particles 3.

Examples of the anti-settling agent include additives that impart a thixotropic property. Examples of the additive that imparts the thixotropic property include organic thixotropic agents for solvent systems, such as those of aliphatic amide type, urea urethane type, polyethylene oxide type, polymerized vegetable oil type, sulfuric acid ester-based anionic surfactant type, polyether/ester-type surfactant type and polycarboxylic acid amine salt type; inorganic fine particle-based thixotropic agents for solvent systems, such as those of organic bentonite type, ultrafine powder silica type and surface-treated calcium carbonate type; and additives of amide wax type, hydrogenated castor oil wax type and benzylidene sorbitol type, and metallic soaps (zinc stearate, aluminum stearate and the like). One or two or more thereof are used.

Since a considerable change in viscosity of the coating material makes it difficult to perform coating, the content ratio of the anti-settling agent to the total amount of the coating material is preferably greater than or equal to 0.5% by volume and less than or equal to and 5.0% by volume, more preferably greater than or equal to 1.0% by volume and less than or equal to 3.0% by volume based on 100% by volume of the total of the coating material except volatile components so that the favorable nonlinear resistance property is obtained.

In the coating material of this embodiment, a diluting solvent may be added to the main component resin for improving workability at the time of performing coating (particularly, workability at the time of performing coating with the coating material used as a spray etc.

As the diluting solvent, mention is made of at least one solvent selected from alcohols, aliphatic (or aromatic) carboxylic acid esters, ketones, ethers, ether esters, aliphatic (or aromatic) hydrocarbons and the like. As a specific example, it is more preferable to use a quick-drying thinner (e.g. a mixture obtained by, for example, xylene, butanol and methyl isobutyl ketone at a mass ratio of 6:2:2), or the like.

The content ratio of the diluting solvent to the total amount of the coating material is preferably greater than or equal to 10% by volume and less than or equal to 40% by volume from the viewpoint of improving the above-described workability.

FIG. 1 is a view schematically showing a longitudinal sectional view of coating film 1. In FIG. 1, core particles 31 are covered with resin layer 32, and thus core particles 31 are prevented from coming into contact with one another in insulating resin 2, so that the dispersed state of core particles 31 is maintained. Thus, resin layer 32 is interposed between core particles 31, so that the nonlinear resistance property development electric field intensity of coating film 1 can be increased.

A conductive path 41 extending to a lower electrode from a surface of the coating film having nonlinear resistance shows a state in which the nonlinear resistance property is developed, so that partial discharge of metallic contaminants is suppressed, resulting in passage of a current. A conductive path 42 in the surface direction of the coating film having nonlinear resistance shows a state in which even at a surface of coating film 1, the nonlinear resistance property is developed due to combination of a resin coating 4 and an anti-settling agent, so that partial discharge of metallic contaminants is suppressed, resulting in passage of a current in the surface direction. The coating material of this embodiment is used for coating the inner surface of a ground tank of a gas insulated switchgear. Coating film 1 of this embodiment can be produced by, for example, coating a surface of a metal base material (the inner surface of the ground tank of the gas insulated switchgear) with the coating material, and curing the coating material. The method for coating the surface with the coating material is not particularly limited, and examples thereof may include a brush coating method and a spraying method.

The content ratio of dispersion particles 3 is preferably greater than or equal to 20% by volume and less than or equal to 70% by volume based on the total amount of coating film 1. Here, it is possible to further increase an electric field intensity at which the resistivity of the coating film as a cured product of the coating material begins to decrease.

Figure 5:
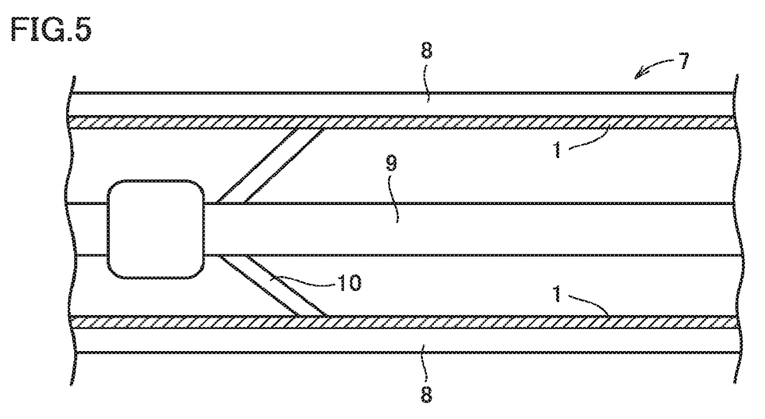
FIG. 5 is an axial sectional view of a gas insulated switchgear according to embodiment 1.

FIG. 5 is an axial sectional view of a gas insulated switchgear 7 according to this embodiment. Gas insulated switchgear 7 includes a cylindrical ground tank 8 which is a pressure vessel; a center conductor 9 which is disposed in ground tank 8 and to which a high voltage is applied; and a support member 10 which is attached to ground tank 8 and which insulates and supports center conductor 9.

FIG. 5 shows a part of gas insulated switchgear 7, and in general, gas insulated switchgear 7 also includes devices such as a breaker and a disconnector (not shown).

A gap between ground tank 8 and center conductor 9 is filled with an insulating gas (e.g. $SF_6$, dry air, $N_2$ or the like) for insulating ground tank 8 and center conductor 9 from each other.

Coating film 1 is formed on the inner surface of ground tank 8. By providing coating film 1 on the inner surface of ground tank 8 as described above, movement (e.g. floating toward the center conductor 9 side) of metallic contaminants mixed in ground tank 8 can be suppressed.

In a coating film having nonlinear resistance, an electric field intensity at which the resistivity begins to decrease (nonlinear resistance property development electric field intensity) can be increased by using dispersion particles 3 obtained by covering core particles 31 with resin layer 32 as described above.

EXAMPLES

Example 1

First, an epoxy resin (36% by volume), zinc oxide particles (number average particle diameter: 55 μm) (38% by volume) covered with a resin layer (average thickness: 0.7 epoxy resin), and a modified urea-type anti-settling agent (product name: BYK-410, manufactured by BYK Japan K.K.) (2.0% by volume) were mixed to obtain a mixture. Next, a quick-drying thinner (specifically, EPONICS THINNER B manufactured by Dai Nippon Toryo Company, Limited) (24% by volume) was added to the mixture, and the resulting mixture was stirred to obtain a coating material. The parenthesized ratio is a ratio to the total amount of the coating material. The obtained coating material was applied onto a circular aluminum plate, and cured to prepare a coating film of Example 1.

Example 2

Except that an anti-settling agent was not added, the same procedure as in Example 1 was carried out to prepare a coating film of Example 2. In this example, the content of the quick-drying thinner was increased to 26% by volume instead of adding the anti-settling agent.

Example 3

Except that the average thickness of a resin layer was 0.2 μm, the same coating material as in Example 1 was used, and the same procedure as in Example 1 was carried out to prepare a coating film of Example 3.

Example 4

Except that the average thickness of a resin layer was 3.0 μm, the same coating material as in Example 1 was used, and the same procedure as in Example 1 was carried out to prepare a coating film of Example 4.

Example 5

Except that the average thickness of a resin layer was 5.0 μm, the same coating material as in Example 1 was used, and the same procedure as in Example 1 was carried out to prepare a coating film of Example 5.

Comparative Example 1

Except that zinc oxide particles that were not covered with a resin layer were used in place of zinc oxide particles covered with a resin layer, the same procedure as in Example 1 was carried out to prepare a coating film of Comparative Example 1. The content of zinc oxide particles in the coating material was the same as in Example 1 (38% by volume).

Comparative Example 2

Except that zinc oxide particles that were not covered with a resin layer were used in place of zinc oxide particles covered with a resin layer, the same procedure as in Example 2 was carried out to prepare a coating film of Comparative Example 2. The content of zinc oxide particles in the coating material was the same as in Example 1 (38% by volume).

<Evaluation Test>

First, coating films (test pieces for evaluation) were prepared using the coating materials of Example 1, Example 2, Example 3, Example 4, Example 5, Comparative Example 1 and Comparative Example 2.

Specifically, each coating material was applied to a surface of a circular aluminum plate having a thickness of 3 mm and a diameter of 100 mm by a spray coating method. Thereafter, the applied coating material was cured at normal temperature for 24 hours to prepare a coating film (test piece for evaluation) having an average thickness of 150 μm.

For the obtained test piece for evaluation, the volume resistivity and the surface resistivity were measured in the following manner.

The volume resistivity was measured in a state in which a main electrode (diameter: 50 mm) and a guard electrode (diameter: 70 mm) on one surface of the test piece for evaluation, and the other surface was made to function as a ground electrode. The applied voltage was changed from a low voltage to a high voltage, and the volume resistivity was measured.

In addition, from the relationship between the electric field intensity and the volume resistivity, an electric field intensity at which the resistivity began to decrease (electric field intensity at which the volume resistivity began to rapidly decrease) was determined as a nonlinear resistance property development electric field intensity. The development electric field intensity can be determined from an intersection of tangents of curves before and after the resistance value of the test piece for evaluation (e.g. an intersection of a tangent parallel to the x axis and a tangent of a curve having a gradient of 30° with respect to the x axis (electric field intensity)).

The surface resistivity was measured in a state in which a double-ring electrode (diameters: 70 mm and 50 mm) was placed on a surface of the test piece for evaluation. A voltage was applied while being changed from a low voltage to a high voltage, and the surface resistivity was measured.

Figure 2:
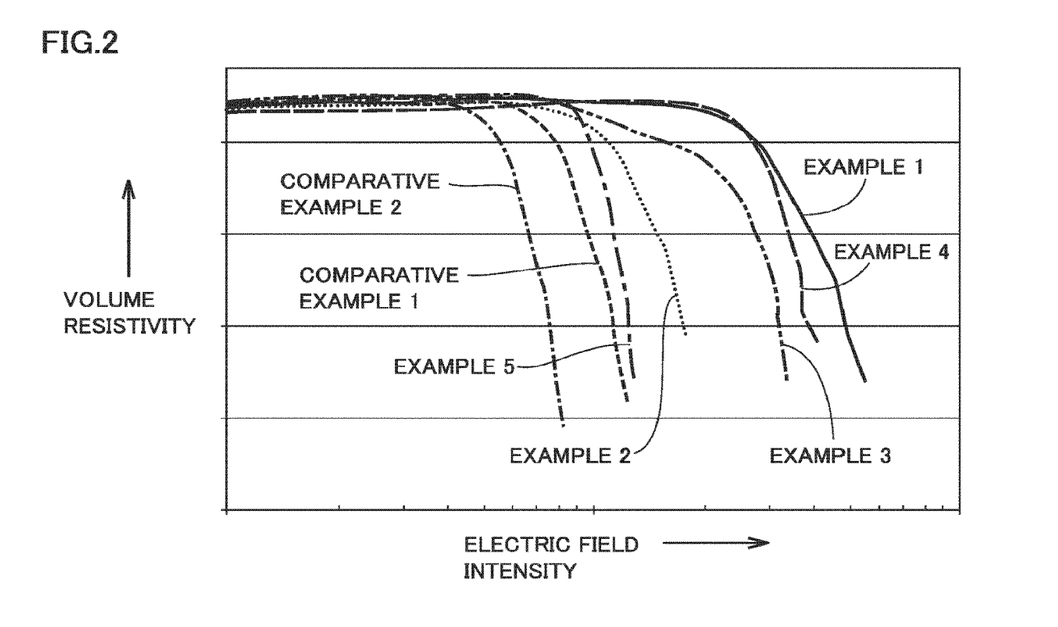
FIG. 2 is a graph showing the results of measuring the volume resistivity in evaluation tests in examples.

FIG. 2 is a graph showing the results of measuring the volume resistivity. FIG. 2 shows that in all of the coating films obtained using the coating materials of Examples 1, 2, 3, 4 and 5 and Comparative Examples 1 and 2, the volume resistivity decreases at a certain electric field intensity, and thus it is apparent that these coating films have the nonlinear resistance property.

It is apparent that the coating films of Examples 1, 3 and 4 have the highest nonlinear resistance property development electric field intensity, and the most favorable nonlinear resistance property. In addition, it is apparent that the development electric filed intensities in Examples 2 and 5 are high although they are not as high as the development electric filed intensity in Example 1.

On the other hand, it is apparent that in Comparative Example 1 where dispersion particles 3 (zinc oxide) are not coated with a resin layer and Comparative Example 2 where dispersion particles 3 are not coated with the resin layer, and an anti-settling agent is absent, the development electric field intensity is lower as compared to Examples 1 to 5.

Figure 3:
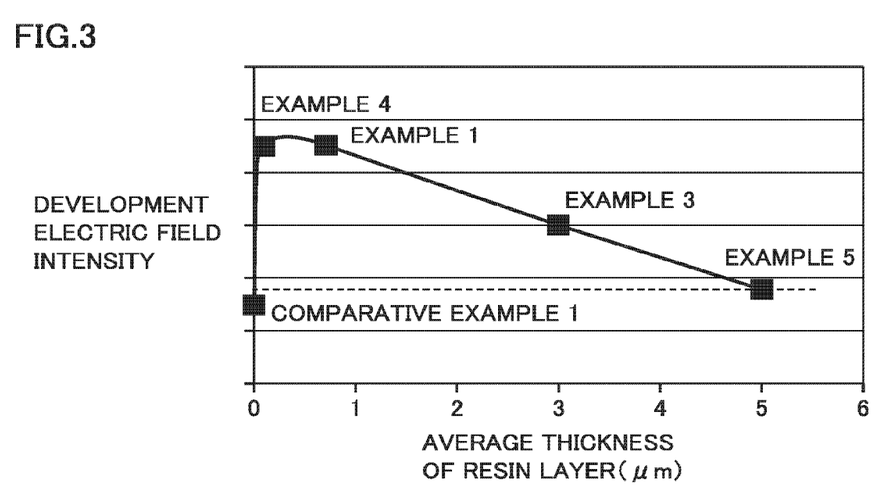
FIG. 3 is a graph showing the effect of the thickness of a resin layer covering particles on the development electric field intensity.

For verifying the effect of the thickness of the resin layer covering zinc oxide particles, a graph in which the development electric field intensity in measurement of the volume resistivity is plotted against the thickness of resin layer 32 is shown in FIG. 3. The results in Examples 1, 3, 4 and 5 show that the development electric field intensity in measurement of the volume resistivity is improved by forming a resin layer.

An increase in the development electric field intensity in coating film 1 of each of Examples 1, 2, 3, 4 and 5 is ascribable to the effect of covering core particles 31 with resin layer 32. The longer the distance between nuclear particles 31, the higher the development electric field intensity. Therefore, by resin layer 32, the distance between core particles 31 in coating film 1 is set to an appropriate distance that is not less than a certain value (twice the thickness of resin layer 32), so that the development electric field intensity of coating film 1 is increased. Thus, it is apparent that when the average thickness of resin layer 32 is less than or equal to 5.0 μm (more preferably between 0.1 μm and 3.0 μm), the development electric field intensity for suppressing the behavior of metallic contaminants increases.

Figure 4:
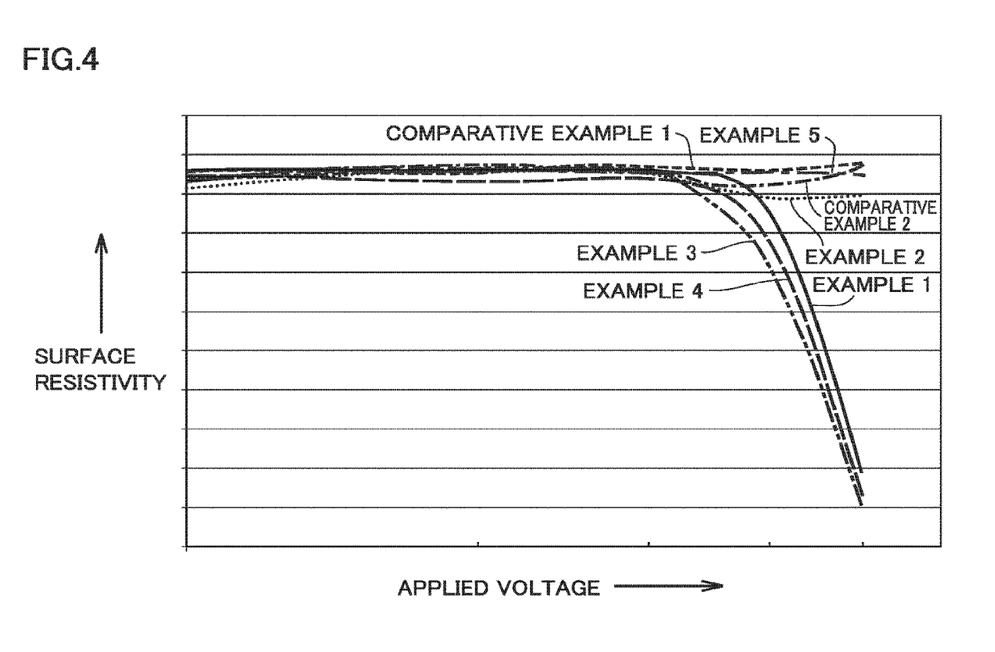
FIG. 4 is a graph showing the results of measuring the surface resistivity in evaluation tests in examples.

FIG. 4 is a graph showing the results of measuring the surface resistivity. FIG. 4 shows that for the surface resistivity, the high-voltage resistance value decreased, and thus the nonlinear resistance property was exhibited only in Examples 1, 3 and 4.

On the other hand, in Example 2 which did not contain an anti-settling agent, Example 5 where the average thickness of resin layer 32 was 5.0 μm, and the distance between particles increased, Comparative Example 1 where dispersed particles 3 (zinc oxide) were not coated with a resin layer, Comparative Example 2 where dispersion particles 3 were not coated with a resin layer, and an anti-settling agent was absent, and Example 5, the nonlinear resistance property was not exhibited. For the surface resistivity, the non-linear resistance property is exhibited when resin layer 32 is present, and the distance thickness is between 0.1 μm and 3.0 μm Coating material blending conditions in preparation of the test pieces, and the results of measuring the volume resistivity and the surface resistivity are collectively shown in Table 1. In "Evaluation of development electric field intensity in volume resistance measurement", evaluation was performed on the basis of a ratio of the development electric field intensity of each coating film to that of the coating film of Comparative Example 1. A sample in which the ratio was greater than or equal to 2 was rated S, a sample in which the ratio was greater than or equal to 1 and less than 2 was rated A, and a sample in which the ratio was less than 1 was rated B. Also, in "Evaluation of development electric field intensity in surface resistance measurement", a sample having the nonlinear resistance property for the development electric field intensity was rated A, and a sample having no nonlinear resistance property for the development electric field intensity was rated B.

TABLE 1

|  | Example 1 | Example 2 | Example 3 | Example 4 | Example 5 | Comparative Example 1 | Comparative Example 2 |
|---|---|---|---|---|---|---|---|
| Thickness of coating film of zinc oxide particle (μm) | 0.7 | 0.7 | 3.0 | 0.1 | 5.0 | None | None |
| Content of zinc oxide particles (% by volume) | 38 | 38 | 38 | 38 | 38 | 38 | 38 |
| Content of anti-settling agent (% by volume) | 2.0 | None | 2.0 | 2.0 | 2.0 | 2.0 | None |
| Evaluation of development electric field intensity in volume resistance measurement | S | A | S | S | A | B | B |
| Evaluation of development electric field intensity in surface resistance measurement | A | B | A | A | B | B | B |

Therefore, it is considered that in the coating film which is a cured product of the coating material in each of Examples 1, 3 and 4, the nonlinear resistance property is exhibited even at a surface of coating film 1 due to combination of resin coating 4 and an anti-settling agent, so that a current passes through conductive path 42 in the surface direction (FIG. 1), leading to suppression of partial discharge of metallic contaminants.

In the surface layer portion of the coating film, metallic contaminants mixed in the ground tank can be inhibited from floating, and therefore the coating film can be thinned. This makes it possible to simplify the coating operation.

The embodiments and examples disclosed herein should be construed to be illustrative in all respects, and nonrestrictive. The scope of the present invention is given by claims rather than the above descriptions, and intended to include meanings equivalent to claims, and all changes within the scope of claims.

REFERENCE SIGNS LIST

1: Coating film, 2: Insulating resin, 3: Dispersion particle, 31: Core particle, 32: Resin layer, 41: Conductive path, 42: Conductive path, 7: Gas insulated switchgear, 8: Ground tank, 9: Center conductor, 10: Support member

The invention claimed is:

1. A coating material, comprising:
an insulating resin; and
a dispersion particle dispersed in the insulating resin, wherein
the dispersion particle comprises zinc oxide as a main component, and
the dispersion particle comprises a core particle having nonlinear resistance, and a resin layer covering a surface of the core particle and having an average thickness of from 0.1 to 3.0 μm, and
the dispersion particle has a umber average particle diameter of 10 to 130 μm.

2. The coating material according to claim 1, wherein the resin layer does not have fluidity at room temperature, and covers the surface of the core particle in a solid state.

3. The coating material according to claim 1, wherein a content ratio of the dispersion particle is from 20% by volume to 70% by volume based on 100% by volume of a total of the coating material except a volatile component.

4. The coating material according to claim 1, further comprising an anti-settling agent.

5. The coating material according to claim 4, wherein a content ratio of the anti-settling is from 0.5% by volume to 5.0% by volume based on 100% by volume of a total of the coating material except a volatile component.

6. The coating material according to claim 1, further comprising a diluting solvent.

7. The coating material according to claim 4, wherein the anti-settling agent includes at least one selected from the group consisting of additives of amide wax, hydrogenated castor oil wax, benzylidene sorbitol, and metallic soaps.

8. The coating material according to claim 5, wherein the content ratio of the anti-settling is from 1.0% by volume to 3.0% by volume based on 100% by volume of a total of the coating material except a volatile component.

9. The coating material according to claim 4, wherein the anti-settling agent includes at least one selected from the group consisting of organic thixotropic agents for solvent systems, and inorganic fine particle thixotropic agents for solvent systems.

* * * * *